US012634063B2

(12) United States Patent
Chen et al.

(10) Patent No.: US 12,634,063 B2
(45) Date of Patent: *May 19, 2026

(54) RANDOM ACCESS TRANSMISSION METHOD AND TERMINAL

(71) Applicant: VIVO MOBILE COMMUNICATION CO.,LTD., Guangdong (CN)

(72) Inventors: Xiaohang Chen, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 838 days.

This patent is subject to a terminal disclaimer.

(21) Appl. No.: 17/377,554

(22) Filed: Jul. 16, 2021

(65) Prior Publication Data

US 2021/0345420 A1 Nov. 4, 2021

Related U.S. Application Data

(63) Continuation of application No. PCT/CN2020/072707, filed on Jan. 17, 2020.

(30) Foreign Application Priority Data

Jan. 18, 2019 (CN) .......................... 201910108504.8

(51) Int. Cl.
H04W 74/08 (2024.01)
H04L 5/00 (2006.01)
(Continued)

(52) U.S. Cl.
CPC ........... H04L 5/0048 (2013.01); H04W 48/10 (2013.01); H04W 74/002 (2013.01);
(Continued)

(58) Field of Classification Search
CPC . H04W 74/0833; H04W 48/10; H04W 74/00; H04W 74/008
See application file for complete search history.

(56) References Cited

U.S. PATENT DOCUMENTS

2014/0086176 A1* 3/2014 Liu ...................... H04W 74/006
370/252
2014/0247799 A1 9/2014 Suzuki et al.
(Continued)

FOREIGN PATENT DOCUMENTS

CN 103858503 A 6/2014
CN 107211462 A 9/2017
(Continued)

OTHER PUBLICATIONS

VIVO, "Views on 2-step RACH design", 3GPP TSG RAN WG1 #96, R1-1901671, Athens, Greece, Feb. 25-Mar. 1, 2019.
(Continued)

*Primary Examiner* — Romani Ohri
(74) *Attorney, Agent, or Firm* — Price Heneveld LLP

(57) ABSTRACT

A random access transmission method and a terminal are provided. The method includes: obtaining a demodulation reference signal (DMRS) sequence generation parameter of a physical uplink shared channel (PUSCH); and sending a random access message according to the DMRS sequence generation parameter; where the random access message corresponds to the PUSCH and a PRACH.

18 Claims, 2 Drawing Sheets

(51) Int. Cl.

| | |
|---|---|
| *H04W 48/10* | (2009.01) |
| *H04W 74/00* | (2009.01) |
| *H04W 74/0833* | (2024.01) |
| *H04W 74/0838* | (2024.01) |

(52) U.S. Cl.
CPC ..... *H04W 74/004* (2013.01); *H04W 74/0833* (2013.01); *H04W 74/0838* (2024.01)

(56)                References Cited

U.S. PATENT DOCUMENTS

| | | | |
|---|---|---|---|
| 2016/0219624 A1 | 7/2016 | Lin et al. | |
| 2020/0045650 A1* | 2/2020 | Suzuki | H04W 76/11 |
| 2020/0092062 A1* | 3/2020 | Yum | H04W 72/23 |
| 2020/0119874 A1* | 4/2020 | Liu | H04L 5/0048 |
| 2020/0221508 A1* | 7/2020 | Huang | H04W 74/006 |
| 2020/0374960 A1* | 11/2020 | Deenoo | H04B 7/088 |
| 2020/0383139 A1 | 12/2020 | Ren et al. | |
| 2021/0006443 A1* | 1/2021 | Morozov | H04L 1/0061 |
| 2021/0185706 A1 | 6/2021 | Park et al. | |
| 2021/0266887 A1* | 8/2021 | Zhang | H04L 5/0053 |
| 2021/0315001 A1* | 10/2021 | Matsumura | H04L 5/0051 |
| 2021/0385038 A1* | 12/2021 | Gao | H04L 5/0048 |

FOREIGN PATENT DOCUMENTS

| | | |
|---|---|---|
| CN | 108633013 A | 10/2018 |
| CN | 108886448 A | 11/2018 |
| WO | 2017059720 A2 | 4/2017 |
| WO | 2018049274 A1 | 3/2018 |
| WO | 2018151230 A1 | 8/2018 |
| WO | 2018172013 A1 | 9/2018 |
| WO | 2020068596 A1 | 4/2020 |

OTHER PUBLICATIONS

VIVO, "Discussion on channel structure for 2-step RACH", 3GPP TSG RAN WG1 #96bis, R1-1904059, Xi'an, China, Apr. 3-12, 2019.

ZTE Corporation, "New work item: 2-step RACH for NR", 3GPP TSG RAN Meeting #82, RP-182894, Sorrento, Italy, Dec. 10-13, 2018.

Intel Corporation, "Remaining Issues on DN-RS", 3GPP TSG RAN WG1 Meeting AH 1801, R1-1800316, Vancouver, Canada, Jan. 22-26, 2018.

ZTE Corporation, "New work item: Two step RACH for NR", 3GPP TSG RAN Meeting #82, RP-182854, Sorrento, Italy, Dec. 10-13, 2018.

VIVO, "Discussion on channel structure for 2-step RACH", 3GPP TSG RAN WG1 #96 bis, R1-1904059, Xi'an, China, Apr. 8-12, 2019.

NTT Docomo, Inc., "Draft CR for configured grant uplink transmission", 3GPP TSG-RAN WG1 Meeting #95, R1-18xxxxx, Spokane, USA, Nov. 12-16, 2018.

\* cited by examiner

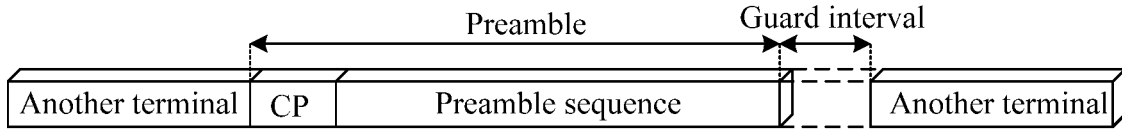

| | Preamble | | Guard interval | |
|---|---|---|---|---|
| Another terminal | CP | Preamble sequence | | Another terminal |

FIG. 1

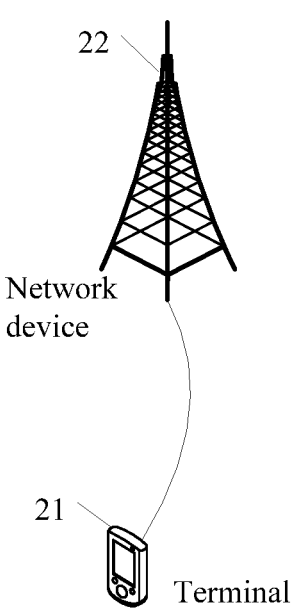

22

Network
device

21

Terminal

FIG. 2

Obtain a demodulation reference signal DMRS sequence generation parameter of a physical uplink shared channel PUSCH          31

Send a random access message according to the DMRS sequence generation parameter; wherein the random access message corresponds to the PUSCH and a physical random access channel PRACH          32

| Terminal |
| --- |
| Obtaining module ⟶ 410 |
| Sending module ⟶ 420 |

50

511

51

Power supply

Radio frequency unit

510

Network module — 52

Audio output unit — 53

54

59

Memory
Application program
Operating system

Processor

Input unit
Graphics processing unit — 541
Microphone — 542

58 — Interface unit

Sensor — 55

User input unit — 571
Touch panel
Another input device

57

572

Display unit
Display panel

56

561

RANDOM ACCESS TRANSMISSION METHOD AND TERMINAL

CROSS-REFERENCE OF RELATED APPLICATION

This application is continuation application of PCT International Application No. PCT/CN2020/072707 filed on Jan. 17, 2020, which claims priority to Chinese Patent Application No. 201910108504.8 filed in China on Jan. 18, 2019, the disclosures of which are incorporated herein by reference in their entireties.

TECHNICAL FIELD

The present disclosure relates to the field of communications technologies, and in particular, to a random access transmission method and a terminal.

BACKGROUND

The 5$^{th}$ generation (5G) mobile communication system, or called the new radio (NR) system needs to adapt to diverse scenarios and service requirements. Main scenarios of the NR system include enhanced Mobile Broadband (eMBB) communications, large-scale Internet of Things (massive Machine Type Communications, mMTC) communications, and ultra-reliable and low latency communications (URLLC). These scenarios require for high reliability, low latency, large bandwidth, wide coverage, and the like of the system. For a periodic service that has a fixed data packet size, in order to reduce overheads of downlink control signaling, a network device can use semi-static scheduling to continuously allocate certain resources for transmission of the periodic service.

In an uplink transmission mode, if a terminal needs to send uplink data, the terminal first obtains uplink timing synchronization through a random access process, that is, obtains uplink timing advance (TA) information from the network device. After obtaining uplink synchronization, the terminal can send uplink data through dynamic scheduling or semi-static scheduling. When an uplink data packet is small, in order to reduce resource and power consumption, the terminal can send uplink data in an asynchronous state.

In the random access process, such as non-contention-based random access process or contention-based random access process, the terminal is also in an asynchronous state when sending a preamble, and a cyclic prefix (CP) needs to be added to the preamble to offset the impact of a transmission delay, as shown in FIG. 1. There is a guard interval between different terminals to reduce interference.

When the terminal sends uplink data in the asynchronous state, for example, when the terminal sends a physical uplink share channel (PUSCH) in the asynchronous state, in order to reduce the impact of interference, a demodulation reference signal (DMRS) sequence of the PUSCH needs to be scrambled. In the non-contention-based random access process, that is, a 2-step PRACH, when the terminal initiates random access, the terminal sends a random access message on a PUSCH in a random access resource, that is, a message A (msgA). In this case, if the network device cannot obtain a DMRS sequence of a PUSCH resource of the terminal, the network device cannot successfully detect msgA sent by the terminal, causing uplink transmission to fail.

SUMMARY

Some embodiments of the present disclosure provide a random access transmission method and a terminal.

According to a first aspect, some embodiments of the present disclosure provide a random access transmission method, applied to a terminal side, including:

obtaining a demodulation reference signal (DMRS) sequence generation parameter of a physical uplink shared channel (PUSCH); and sending a random access message according to the DMRS sequence generation parameter; where the random access message corresponds to the PUSCH and a physical random access channel (PRACH).

According to a second aspect, some embodiments of the present disclosure further provide a terminal, including:

an obtaining module, configured to obtain a demodulation reference signal (DMRS) sequence generation parameter of a physical uplink shared channel (PUSCH); and a sending module, configured to send a random access message according to the DMRS sequence generation parameter; where the random access message corresponds to the PUSCH and a physical random access channel (PRACH).

According to a third aspect, some embodiments of the present disclosure provide a terminal. The terminal includes a processor, a memory, and a program stored in the memory and running on the processor. When the program is executed by the processor, the steps of the foregoing random access transmission method are implemented.

According to a fourth aspect, some embodiments of the present disclosure provide a computer-readable storage medium. The computer-readable storage medium stores a computer program, and when the computer program is executed by a processor, the steps of the foregoing random access transmission method are implemented.

In this way, in the embodiments of the present disclosure, during the random access process, the terminal sends the random access message on the random access resource according to the DMRS sequence generation parameter of the PUSCH. Correspondingly, the network device demodulates the PUSCH on the random access resource according to to the DMRS sequence generation parameter, to obtain the corresponding random access message. This improves the success rate of data detection, avoids unnecessary blind detection, and reduces detection complexity of the network device.

BRIEF DESCRIPTION OF DRAWINGS

To better clarify the technical solutions in the embodiments of this disclosure, the accompanying drawings for describing the embodiments of this disclosure are briefly described below. Apparently, the accompanying drawings described below merely illustrate some of the embodiments of this disclosure. Persons of ordinary skill in the art can derive other accompanying drawings from these accompanying drawings.

FIG. 1 is a schematic diagram of resource mapping of a random access message during a random access process;

FIG. 2 is a block diagram of a mobile communications system to which some embodiments of the present disclosure can be applied;

FIG. 3 is a schematic flowchart of a random access transmission method according to some embodiments of the present disclosure;

DETAILED DESCRIPTION OF EMBODIMENTS

Figures 4, 5:
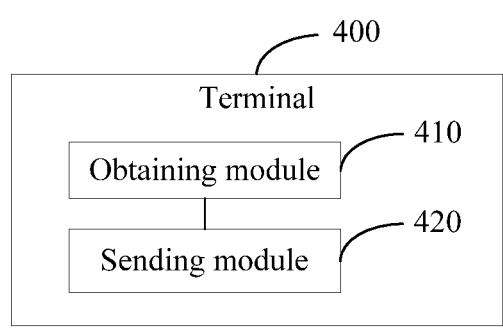
FIG. 4 is a schematic diagram of a modular structure of a terminal according to some embodiments of the present disclosure.
FIG. 5 is a structural block diagram of a terminal according to some embodiments of the present disclosure.

Exemplary embodiments of the present disclosure will be described below in further detail with reference to the accompanying drawings. Although the accompanying drawings show exemplary embodiments of this disclosure, it should be understood that this disclosure may be implemented in various manners and shall not be limited to the embodiments described herein. On the contrary, these embodiments are provided to understand this disclosure more thoroughly and allow a person skilled in the art entirely comprehend the scope of this disclosure.

Terms such as "first" and "second" in the specification and claims of the present application are used to distinguish similar objects, instead of describing a specific sequence or order. It should be understood that the data termed in such a way is interchangeable in proper circumstances so that the embodiments of this application described herein can be implemented in an order other than the order illustrated or described herein. Moreover, the terms "include", "contain" and any variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. "And/or" used in this specification and claims means at least one of the associated objects.

The technology described in this specification is not limited to the long term evolution (LTE)/LTE-Advanced (LTE-A) system. It can also be applied in various wireless communication systems such as code division multiple access (CDMA), time division multiple access (TDMA), frequency division multiple access (FDMA), orthogonal frequency division multiple access (OFDMA), single-carrier frequency-division multiple access (SC-FDMA) and other systems. The terms "system" and "network" are often used interchangeably. The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following description provides examples and does not limit the scope, applicability, or configuration set forth in the claims. The functions and arrangements of the elements under discussion may be changed without departing from the spirit and scope of the present disclosure. In various examples, various procedures or components may be omitted, replaced, or added appropriately. For example, the described methods can be performed in a different order than that described, and various steps can be added, omitted, or combined. In addition, features described with reference to some examples may be combined in other examples.

Referring to FIG. 2, FIG. 2 is a block diagram of a wireless communications system applicable to some embodiments of the present disclosure. The wireless communications system includes a terminal 21 and a network device 22. The terminal 21 may also be referred to as a terminal device or user equipment (UE). The terminal 21 may be a terminal side device such as a mobile phone, a tablet personal computer, a laptop computer, a personal digital assistant (PDA), a mobile internet device (MID), a wearable device, or an in-vehicle device. It should be noted that a specific type of the terminal 21 is not limited in the embodiments of the present invention. The network device 22 may be a base station or a core network. The base station may be a base station of 5G and later releases (for example, a gNB and a 5G NR NB), or a base station in other communications systems (for example, an eNB, a WLAN access point, or other access points). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, or another appropriate term in the art. Provided that the same technical effects are achieved, the base station is not limited to specific technical vocabulary. It should be noted that in some embodiments of the present disclosure, the base station in the NR system is merely used as an example, but does not limit a specific type of the base station.

The base station can communicate with the terminal 21 under the control of a base station controller. In various examples, the base station controller may be a part of the core network or some base stations. Some base stations can communicate control information or user data with the core network through backhaul. In some examples, some of these base stations can directly or indirectly communicate with each other over a backhaul link, which may be a wired or wireless communication link. The wireless communications system can support operations on a plurality of carriers (waveform signals of different frequencies). A multi-carrier transmitter can simultaneously transmit modulated signals on these plurality of carriers. For example, each communication link may be a multi-carrier signal modulated based on various radio technologies. Each modulated signal can be sent over different carriers and can carry control information (for example, a reference signal or a control channel), overhead information, data, and the like.

The base station can communicate wirelessly with the terminal 21 via one or more access point antennas. Each base station can provide communication coverage for its corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access network or operator deployment. Coverage areas of different base stations (including coverage areas of base stations of the same or different types, coverage areas using the same or different radio technologies, or coverage areas belonging to the same or different access networks) may overlap.

Communications links in a wireless communication system may include an uplink for carrying an uplink (UL) transmission (for example, a transmission from the terminal 21 to the network device 22), or a downlink for carrying a downlink (DL) transmission (for example, a transmission from the network device 22 to the terminal 21). The UL transmission may also be referred to as reverse link transmission, and the DL transmission may also be referred to as forward link transmission. The downlink transmission may be performed over a licensed frequency band, an unlicensed frequency band, or the both. Similarly, the uplink transmission may be performed over a licensed frequency band, an unlicensed frequency band, or the both.

Some embodiments of the present disclosure provide a random access transmission method, applied to a terminal side. As shown in FIG. 3, the method includes the following steps:

Step 31: Obtain a demodulation reference signal (DMRS) sequence generation parameter of a physical uplink shared channel (PUSCH).

The DMRS sequence generation parameter is determined according to a first parameter item, or the DMRS sequence generation parameter is configured by a network device. The DMRS sequence generation parameter is used to generate a DMRS of the PUSCH. The DMRS sequence generation parameter includes: a scrambling initialization parameter and/or a scrambling identifier parameter of the DMRS of the PUSCH. Further, the DMRS sequence generation parameter may be determined according to a first parameter item, where the first parameter item is related to the PRACH resource and/or the PUSCH resource, for example, the first parameter item includes parameter information related to the PRACH resource and/or the PUSCH resource. The parameter information related to the PRACH resource and/or the PUSCH resource both can include multiple parameters, and the DMRS sequence generation parameter can be determined according to at least one of the multiple parameters.

Alternatively, the DMRS sequence generation parameter can also be configured by the network device. The terminal obtains a random access channel RACH configuration from the network device, and the terminal obtains the DMRS sequence generation parameter from the RACH configuration. For example, the DMRS sequence generation parameter is one of at least one DMRS sequence generation parameter in a DMRS sequence generation parameter set of the RACH configuration. For example, the DMRS sequence generation parameter set includes 4 DMRS sequence generation parameters, and the terminal chooses one of the four DMRS sequence generation parameters in the DMRS sequence generation parameter set according to preset rules. It is worth pointing out that the number of DMRS sequence generation parameter sets can be one or more.

Step 32: Send a random access message according to the DMRS sequence generation parameter; where the random access message corresponds to the PUSCH and a physical random access channel (PRACH).

The terminal sends a random access message (msgA) on a random access resource according to the DMRS sequence generation parameter. Random access resources are used in the random access process, and random access resources correspond to a PRACH resource and a PUSCH resource. The PRACH resource is used to transmit a random access preamble, and the PUSCH resource is used to transmit information or uplink data related to random access. Correspondingly, the network device receives the random access message on the random access resource. It is worth pointing out that the network device can also determine the DMRS sequence generation parameter according to the first parameter item, that is, the network device and the terminal have consistent understanding, and can both determine the DMRS sequence generation parameter according to the first parameter item. In this way, the network device can directly demodulate the PUSCH according to the DMRS sequence generation parameter, thereby obtaining msgA, and ensuring normal progress of the random access process.

Further, step 32 can be implemented, but not limited to, in the following manners: according to the DMRS sequence generation parameter, determining the DMRS sequence of the PUSCH; and sending the random access message according to the DMRS sequence. A pseudo random sequence used when the DMRS sequence is generated is initialized according to the following manner: the initialized pseudo random sequence of the DMRS is a function of the DMRS sequence generation parameter, such as $$c_{init} = f\left(N_{ID}^{nSCID}, \ldots\right).$$

$$N_{ID}^{nSCID}$$

is the scrambling initialization parameter of the DMRS of PUSCH; and $n_{SCID}$ is the scrambling identifier parameter of the DMRS of PUSCH.

Specifically, the initialized pseudo random sequence of the DMRS of the PUSCH can be obtained through the following functional relationship:

$$c_{init} = \left(2^{17}\left(N_{symb}^{slot}n_{s,f}^{\mu} + 1 + 1\right)\left(2N_{ID}^{nSCID} + 1\right) + 2N_{ID}^{nSCID} + n_{SCID}\right) \bmod 2^{31}$$

$c_{init}$ is the initialized pseudo random sequence used when the DMRS sequence of the PUSCH is generated, $$N_{symb}^{slot}$$

is the number of time-domain symbols contained in a slot $$n_{s,f}^{\mu}$$

is a number of a slot in a next radio frame in a subcarrier spacing configuration ($\mu$), 1 is the length of the DMRS sequence, $$N_{ID}^{nSCID}$$

is the scrambling initialization parameter of the DMRS of PUSCH, and $n_{SCID}$ is the scrambling identifier parameter of the DMRS of the PUSCH.

Further, the DMRS sequence generation parameter can be determined according to the PRACH resource and/or the PUSCH resource. For example, the DMRS sequence generation parameter is determined according to a parameter item associated with the PRACH resource and/or a parameter item associated with the PUSCH resource. For example: the DMRS sequence generation parameter is determined according to a parameter associated with the PRACH resource; or the DMRS sequence generation parameter is determined according to a parameter associated with the PUSCH resource, or the DMRS sequence generation parameter is determined according to both the parameter associated with the PRACH resource and the parameter associated with the PUSCH resource.

For example, the DMRS sequence generation parameter is determined according to a parameter associated with the PUSCH resource. Optionally, the DMRS sequence generation parameter is determined according to a PUSCH occasion corresponding to the PUSCH resource. That is, the DMRS sequence generation parameter is obtained according to the PUSCH occasion, where the PUSCH occasion is used for transmission of an msgA-related PUSCH (msgA PUSCH).

Optionally, the DMRS sequence generation parameter is determined according to a time domain resource index (time index) and/or a frequency domain resource index (frequency index) of the PUSCH occasion. For example, the terminal determines the DMRS sequence generation parameter according to a function g of time index and frequency index of the PUSCH occasion. For example, the scrambling initialization parameter $$N_{ID}^{nSCID}$$

of the DMRS of the PUSCH is equal to g (time index, frequency index). For another example, the number of $n_{SCID}$ candidate values in an $n_{SCID}$ set of scrambling identifier parameters of the DMRS of the PUSCH is M, and $n_{SCID}$ is equal to g (time index, frequency index) mod M.

The above describes that the DMRS sequence generation parameter is determined according to information related to the PUSCH resource, and the following will further explain that the DMRS sequence generation parameter is determined according to information related to the PRACH resource.

When the DMRS sequence generation parameter is determined according to information related to the PRACH resource, the DMRS sequence generation parameter is determined according to at least one of the following information of the PRACH resource:

1. Random Access Channel Occasion (RO).

The DMRS sequence generation parameter can be determined according to the random access channel occasion (RO). In the NR system, a network device can configure that in a time instance, there are multiple physical random channel transmission occasions (PRACH occasion, or simply referred to as RO) that are frequency division multiplexed (Frequency Division Multiplex, FDM). The time instance is duration required for a physical random channel (PRACH), or a time domain resource used to transmit a PRACH. The number of ROs that can perform FDM in a time instance can be: {1, 2, 4, 8}. Further optionally, the RO mentioned herein may be an effective RO, and the effective RO is an RO that can be used to transmit a PRACH.

Further, the DMRS sequence generation parameter is determined according to at least one of the following information associated with the RO:

1. First index information of a synchronization signal block (Synchronization Signal and Physical Broadcast Channel Block, SS/PBCH block, or SSB for short) associated with the RO. That is, the DMRS sequence generation parameter can be determined according to the first index information of the SSB associated with the RO. For example, the scrambling initialization parameter $$N_{ID}^{nSCID}$$

of the DMRS of the PUSCH is equal to the first index information of the SSB associated with the RO. For another example, the number of $n_{SCID}$ candidate values in $n_{SCID}$ set of the scrambling identifier parameters of the DMRS of the PUSCH is M, and $n_{SCID}$ is equal to (the first index information of the SSB associated with the RO) mod M. There is an association relationship between an RO and a synchronization signal and physical broadcast channel block (SS/PBCH block, or SSB for short) that is actually sent. One RO may be associated with multiple SSBs, one SSB may also be associated with multiple ROs, and the number of SSBs associated with one RO can be {⅛, ¼, ½, 1, 2, 4, 8, 16}. For example, the number of ROs that can perform FDM in a time instance can be 8, the number of SSBs actually transmitted is 4, namely, SSB #0, SSB #1, SSB #2, and SSB #3, and each SSB is associated with 2 ROs. If the terminal sends a PRACH on an RO corresponding to the SSB0, the terminal can only select one RO from RO #0 and RO #1 to send the PRACH. It's worth pointing out that in the non-contention-based random access process, there may also be an association relationship between an RO and a channel state information reference signal (CSI-RS). Correspondingly, the DMRS sequence generation parameter can also be determined according to a CSI-RS corresponding to the RO.

2. Second index information of a time-frequency domain resource corresponding to the RO. That is, the DMRS sequence generation parameter can be determined according to the second index information of the time-frequency domain resource corresponding to the RO. The second index information includes, but is not limited to: time domain index information (time index) and/or frequency domain index information (frequency index) corresponding to the RO. For example, the DMRS sequence generation parameter can be calculated through a function h of the time domain index information and the frequency domain index information corresponding to the RO. For example, the scrambling initialization parameter $$N_{ID}^{nSCID}$$

of the DMRS of the PUSCH is equal to h (time index, frequency index). For another example, the number of $n_{SCID}$ candidate values in $n_{SCID}$ set of the scrambling identifier parameters of the DMRS of the PUSCH is M, and $n_{SCID}$ is equal to h (time index, frequency index) mod M.

3. Third index information of a primary synchronization signal (PSS) transmitted in the SSB related to the RO. That is, the DMRS sequence generation parameter can be further determined according to index information of the PSS transmitted in the SSB associated with the RO. For example, the scrambling initialization parameter $$N_{ID}^{nSCID}$$

of the DMRS of the PUSCH is equal to index information of the PSS transmitted in the SSB. For another example, the number of $n_{SCID}$ candidate values in $n_{SCID}$ set of the scrambling identifier parameters of the DMRS of the PUSCH is M, and $n_{SCID}$ is equal to (index information of the PSS transmitted in the SSB) mod M.

4. Fourth index information of a secondary synchronization signal (SSS) transmitted in the SSB related to the RO. That is, the DMRS sequence generation parameter can be further determined according to index information of the SSS transmitted in the SSB associated with the RO. For example, the scrambling initialization parameter $$N_{ID}^{n_{SCID}}$$

of the DMRS of the PUSCH is equal to index information of the SSS transmitted in the SSB. For another example, the number of $n_{SCID}$ candidate values in $n_{SCID}$ set of the scrambling identifier parameters of the DMRS of the PUSCH is M, and $n_{SCID}$ is equal to (index information of the SSS transmitted in the SSB) mod M.

2: Random Access Preamble

The DMRS sequence generation parameter can be determined according to the random access preamble. The random access preamble can only be transmitted on a time domain resource configured by a parameter of a PRACH configuration index (ConfigurationIndex) and a frequency domain resource configured by a parameter of prach-FDM. That is, the random access preamble can only be transmitted in the RO. A PRACH frequency domain resource $N_{RA} \in \{0, 1, \ldots, M-1\}$, where M is equal to a high-level parameter of prach-FDM. During initial access, the PRACH frequency domain resource $N_{RA}$ is numbered in ascending order starting from an RO resource with the lowest frequency in an initial active uplink bandwidth part. Otherwise, the PRACH frequency domain resource $N_{RA}$ is numbered in ascending order starting from an RO resource with the lowest frequency in an active uplink bandwidth part. Specifically, the DMRS sequence generation parameter is determined according to the index information of the random access preamble. That is, the DMRS sequence generation parameter is determined according to the preamble index. For example, the scrambling initialization parameter $$N_{ID}^{n_{SCID}}$$

of the DMRS of the PUSCH is equal to preamble index information. For another example, the number of $n_{SCID}$ candidate values in $n_{SCID}$ set of the scrambling identifier parameters of the DMRS of the PUSCH is M, and $n_{SCID}$ is equal to (preamble index information) mod M.

It should be noted that the DMRS sequence generation parameter can be further determined according to both the random access channel occasion (RO) and the random access preamble. For example, if RO1 is associated with two pieces of SSB index information, SSB #0 and SSB #1, the terminal can obtain two possible DMRS sequence generation parameters A and B according to the SSB index information associated with RO1. Further, if two pieces of random access preamble index information in RO1 are associated with one piece of SSB index information, such as preamble #1 and preamble #2 are associated with SSB #0, the terminal can obtain the finally determined DMRS sequence generation parameter A or B according to the preamble index information. If it is preamble #1, the terminal determines that the DMRS sequence generation parameter is A, and if it is preamble #2, determines that the DMRS sequence generation parameter is B.

3. Random access-radio network temporary identifier (RA-RNTI). That is, the DMRS sequence generation parameter can be determined according to the RA-RNTI, for example, the scrambling initialization parameter $$N_{ID}^{n_{SCID}}$$

of the DMRS of the PUSCH is equal to the RA-RNTI.

The foregoing describes the manner of determining the DMRS sequence generation parameter according to a first parameter item, and the following further describes a manner of configuring the DMRS sequence generation parameter by a network device.

Specifically, the DMRS sequence generation parameter is configured by the network device through a system broadcast message, where the system broadcast message includes: a system information block (SIB) or a master information block (MIB).

Further, the system broadcast message may include: a DMRS sequence generation parameter, or the system broadcast message includes: configuration information of the DMRS sequence generation parameter set. The DMRS sequence generation parameter is a parameter in the DMRS sequence generation parameter set (such as an ID set) configured by the network device through the system broadcast message. In this embodiment, the DMRS sequence generation parameter $n_{ID}$ is one parameter in the ID set configured in the system broadcast message SIB/MIB. It is worth pointing out that if the DMRS sequence generation parameter set is not configured in the SIB/MIB, the terminal uses a default DMRS sequence generation parameter, for example, the default DMRS sequence generation parameter $n_{ID}$ is defined as a cell number (Cell ID).

Further, it is assumed that the DMRS sequence generation parameter set includes K $n_{ID}$, and further, the DMRS sequence generation parameter $n_{ID}$ is one parameter associated with the following related parameters in the DMRS sequence generation parameter set:

1. RO Corresponding to a Random Access Process.

The terminal selects $n_{ID}$ from the set of K DMRS sequence generation parameters $n_{ID}$ according to the RO. The network device configures or predefines the association relationship between an RO and $n_{ID}$, such as: every N ROs are associated with one $n_{ID}$.

2: Index Information of the SSB Associated with the RO.

The terminal selects $n_{ID}$ from the set of K $n_{ID}$ according to index information of the SSB associated with the RO. The network device configures or predefines the association relationship between an SSB and $n_{ID}$, such as:

each M SSBs are associated with one $n_{ID}$. Specifically, in a given RO, if there are M SSBs associated, random access preambles transmitted in the RO all correspond to a same $n_{ID}$.

3. Index Information of the Random Access Preamble.

The terminal selects $n_{ID}$ from the set of K $n_{ID}$ according to index information of the PRACH preamble transmitted in msgA. The network device configures or predefines the association relationship between a preamble and $n_{ID}$, such as: every R random access preambles are related to one $n_{ID}$. Specifically, in a given RO, if there are N*R consecutively numbered preambles, preambles transmitted in the RO correspond to $n_{ID,1}$ to $n_{ID,N}$.

Further, when the DMRS sequence generation parameter is configured by the network device, the DMRS sequence generation parameter is one parameter in the DMRS sequence generation parameter set configured by the network device through the system broadcast message, where the system broadcast message may also include at least one of the following information:

an association relationship between the RO and the DMRS sequence generation parameter; where for example, an association relationship between the RO and the DMRS sequence generation parameter is: every N ROs are associated with a DMRS sequence generation parameter of a PUSCH; or an association relationship between the random access preamble and the DMRS sequence generation parameter. For example, an association relationship between the preamble and the DMRS sequence generation parameter is: R preambles are associated with a DMRS sequence generation parameter of a PUSCH. R consecutively numbered preambles are associated with a DMRS sequence generation parameter $n_{ID,K}$ of a PUSCH in each RO, where $0 \le k \le K-1$.

Specifically, step 32 of some embodiments of the present disclosure may also be implemented in the following implementations: mapping between the DMRS sequence generation parameter and a corresponding random access resource according to a mapping order, and sending the random access message; where the mapping order includes at least one of: a code domain mapping order, a frequency domain mapping order, or a time domain mapping order. Specifically, for example, the manner of mapping sequentially in accordance with the code domain mapping order, the frequency domain mapping order, and the time domain mapping order. In this embodiment, the DMRS sequence generation parameters of multiple PUSCHs are associated with ROs in the following order:

First, the DMRS sequence generation parameters are associated with multiple preambles of one RO in ascending or descending order in code domain (preamble index).

Secondly, the DMRS sequence generation parameters are associated with multiple FDM ROs in ascending or descending order in frequency domain (frequency resource index).

Third, the DMRS sequence generation parameters are associated with multiple time division multiplexing (TDM) ROs in a PRACH slot in ascending or descending order in time domain (time resource index).

Finally, the DMRS sequence generation parameters are associated with multiple PRACH slots in ascending order of PRACH slots.

In the embodiments of the present disclosure, in the random access transmission method, during the random access process, the terminal sends the random access message on the random access resource according to the DMRS sequence generation parameter of the PUSCH. Correspondingly, the network device demodulates the PUSCH on the random access resource according to the DMRS sequence generation parameter, to obtain the corresponding random access message. This improves the success rate of data detection, avoids unnecessary blind detection, and reduces detection complexity of the network device.

The random access transmission method in different scenarios are separately described in detail in the foregoing embodiment. A terminal corresponding to the method is further described in the following embodiment with reference to the accompanying drawings.

As shown in FIG. 4, FIG. 4 is a block diagram of a terminal according to some embodiments of the present disclosure. The terminal 400 can perform details of the method in the foregoing embodiment: obtaining a demodulation reference signal (DMRS) sequence generation parameter of a physical uplink shared channel (PUSCH); and sending a random access message according to the DMRS sequence generation parameter; and achieve the same effect. The random access message corresponds to the PUSCH and a physical random access channel (PRACH). The terminal 400 specifically includes the following functional module:

an obtaining module 410, configured to obtain a demodulation reference signal (DMRS) sequence generation parameter of a physical uplink shared channel (PUSCH); and a sending module 420, configured to send a random access message according to the DMRS sequence generation parameter; where the random access message corresponds to the PUSCH and a physical random access channel (PRACH).

The DMRS sequence generation parameter includes: a scrambling initialization parameter and/or a scrambling identifier parameter.

The sending module includes:

a determining submodule, configured to determine a DMRS sequence of the PUSCH according to the DMRS sequence generation parameter; and a first sending submodule, configured to send the random access message on the random access resource according to the DMRS sequence.

The DMRS sequence generation parameter is determined according to a PUSCH resource and/or a PRACH resource.

The DMRS sequence generation parameter is determined according to a PUSCH occasion corresponding to the PUSCH resource.

The DMRS sequence generation parameter is determined according to at least one of the following information of the PRACH resource:

a random access channel occasion (RO);

a random access preamble; or a random access radio network temporary identifier (RA-RNTI).

The DMRS sequence generation parameter is determined according to at least one of the following information associated with the RO:

first index information of a synchronization signal block (SSB) associated with the RO;

second index information of a time-frequency domain resource corresponding to the RO;

third index information of a primary synchronization signal (PSS) transmitted in an SSB associated with the RO; or fourth index information of a secondary synchronization signal (SSS) transmitted in an SSB associated with the RO.

The DMRS sequence generation parameter is determined according to index information of the random access preamble.

The DMRS sequence generation parameter is configured by a network device through a system broadcast message.

The system broadcast message includes: configuration information of a DMRS sequence generation set.

The DMRS sequence generation parameter is a parameter associated with the following associated parameters in the DMRS sequence generation parameter set:

an RO corresponding to a random access process;

index information of the SSB associated with the RO; and index information of the random access preamble.

The system broadcast message further includes at least one of the following information:

an association relationship between the RO and the DMRS sequence generation parameter; or an association relationship between the random access preamble and the DMRS sequence generation parameter.

The sending module 420 further includes:

a second sending submodule, configured to map the DMRS sequence generation parameter to a corresponding random access resource according to a mapping order, and sending the random access message; where the mapping order includes at least one of: a code domain mapping order, a frequency domain mapping order, or a time domain mapping order.

It's worth pointing out that, in the embodiments of the present disclosure, during the random access process, the terminal sends the random access message on the random access resource according to the DMRS sequence generation parameter of the PUSCH. Correspondingly, the network device demodulates the PUSCH on the random access resource according to the DMRS sequence generation parameter, to obtain the corresponding random access message. This improves the success rate of data detection, avoids unnecessary blind detection, and reduces detection complexity of the network device.

It should be noted that, it should be understood that the division of the various modules of the foregoing network device and terminal is merely logical function division, and during actual implementation, the various module may be completely or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementation of other modules is similar thereto. In addition, all or some of these modules may be integrated together or implemented independently. The processing element herein may be an integrated circuit chip, having a signal processing capability. During implementation, the steps of the foregoing method or the foregoing modules can be completed by hardware integrated logic circuits in the processor element or instructions in the form of software.

For example, the above modules can be configured into one or more integrated circuits to perform the above methods, such as: one or more application specific integrated circuits (ASIC), one or more digital signal processors (DSP), one or more field programmable gate arrays (FPGA), or the like. For another example, when a module above is implemented by invoking program code by using a processing element, the processing element may be a general-purpose processor, for example, a central processing unit (CPU) or another processor that can invoke program code. For another example, these modules may be integrated together and implemented in the form of a system-on-a-chip (SOC).

To better achieve the foregoing objective, further, FIG. 5 is a schematic structural diagram of hardware of a terminal for implementing the various embodiments of this disclosure. The terminal 50 includes, but is not limited to: components such as a radio frequency unit 51, a network module 52, an audio output unit 53, an input unit 54, a sensor 55, a display unit 56, a user input unit 57, an interface unit 58, a memory 59, a processor 510, and a power supply 511. It can be understood by persons skilled in the art that the structure of the terminal shown in FIG. 5 does not constitute a limitation on the terminal, and the terminal may include more or fewer components than those shown in the figure, or combine some components, or have different component arrangements. In some embodiments of the present disclosure, the terminal includes but is not limited to a mobile phone, a tablet computer, a notebook computer, a palmtop computer, an in-vehicle terminal, a wearable device, a pedometer, and the like.

The radio frequency unit 51 is configured to obtain a demodulation reference signal (DMRS) sequence generation parameter of a physical uplink shared channel (PUSCH); and send a random access message according to the DMRS sequence generation parameter; where the random access message corresponds to the PUSCH and a physical random access channel (PRACH).

The processor 510 is configured to control the radio frequency unit 51 to send and receive data.

In the embodiments of the present disclosure, during the random access process, the terminal sends the random access message on the random access resource according to the DMRS sequence generation parameter of the PUSCH. Correspondingly, the network device demodulates the PUSCH on the random access resource according to the DMRS sequence generation parameter, to obtain the corresponding random access message. This improves the success rate of data detection, avoids unnecessary blind detection, and reduces detection complexity of the network device.

It should be understood that, in some embodiments of the present disclosure, the radio frequency unit 51 may be configured to receive and send information or receive and send a signal in a call process. Specifically, after receiving downlink data from a base station, the radio frequency unit 51 sends the downlink data to the processor 510 for processing. In addition, the radio frequency unit 51 sends uplink data to the base station. Generally, the radio frequency unit 51 includes but is not limited to an antenna, at least one amplifier, a transceiver, a coupler, a low noise amplifier, a duplexer, and the like. In addition, the radio frequency unit 51 may further communicate with a network and another device by using a wireless communication system.

The terminal provides wireless broadband Internet access to a user through the network module 52, for example, helps the user receive and send emails, browse web pages, and access streaming media.

The audio output unit 53 may convert audio data received by the radio frequency unit 51 or the network module 52 or stored in the memory 59 into an audio signal and output as sound. Moreover, the audio output unit 53 may further provide audio output (for example, call signal receiving sound and message receiving sound) related to a specific function performed by the terminal 50. The audio output unit 53 includes a speaker, a buzzer, a receiver, and the like.

The input unit 54 is configured to receive an audio signal or a video signal. The input unit 54 may include a graphics processing unit (GPU) 541 and a microphone 542. The graphics processing unit 541 processes image data of a static picture or a video obtained by an image capture apparatus (for example, a camera) in video capture mode or image capture mode. A processed image frame can be displayed on the display unit 56. The image frame processed by the graphics processing unit 541 can be stored in the memory 59

(or another storage medium) or sent via the radio frequency unit 51 or the network module 52. The microphone 542 may receive a sound and can process such sound into audio data. The processed audio data can be converted into a format output that can be sent to a mobile communications base station through the radio frequency unit 51 in a telephone call mode.

The terminal 50 further includes at least one sensor 55, such as a light sensor, a motion sensor, and other sensors. Specifically, the light sensor includes an ambient light sensor and a proximity sensor, where the ambient light sensor can adjust brightness of the display panel 561 depending on luminance of ambient light, and the proximity sensor can turn off the display panel 561 and/or backlight when the terminal 50 moves near the ear. As a type of motion sensor, an accelerometer sensor can detect accelerations in all directions (generally three axes), and can detect the magnitude and direction of gravity when it is still. The accelerometer sensor may be configured to identify a terminal posture (for example, switching between a landscape mode and a portrait mode, related games, and magnetometer posture calibration), perform vibration identification-related functions (for example, a pedometer and a knock), and the like. The sensor 55 may further include a fingerprint sensor, a pressure sensor, an iris sensor, a molecular sensor, a gyroscope, a barometer, a hygrometer, a thermometer, an infrared sensor, and the like. Details are not described herein again.

The display unit 56 is configured to display information input by a user or information provided to a user. The display unit 56 may include a display panel 561, and the display panel 561 may be configured in a form of a liquid crystal display (LCD), an organic light-emitting diode (OLED), or the like.

The user input unit 57 may be configured to receive input numeral or character information, and generate key signal input related to user setting and function control of the terminal. Specifically, the user input unit 57 includes a touch panel 571 and another input device 572. The touch panel 571 is also referred to as a touchscreen, and can collect a touch operation on or near the touch panel 571 by a user (for example, an operation on or near the touch panel 571 by the user with any suitable object or accessory such as a finger or a stylus). The touch panel 571 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 510, and receives and executes a command from the processor 510. In addition, the touch panel 571 can be implemented by various types such as a resistive type, a capacitive type, an infrared ray type or a surface acoustic wave type. In addition to the touch panel 571, the user input unit 57 may also include the another input device 572. Specifically, the another input device 572 may include, but is not limited to, a physical keyboard, functional keys (for example, a volume control key and a switch key), a trackball, a mouse, and a joystick. Details are not described herein again.

Further, the touch panel 571 may cover the display panel 561. When the touch panel 571 detects a touch operation on or near the touch panel 571, the touch operation is transmitted to the processor 510 to determine a type of a touch event, and then the processor 510 provides corresponding visual output on the display panel 561 according to the type of the touch event. Although in FIG. 5, the touch panel 571 and the display panel 561 are two independent components for implementing input and output functions of the terminal, in some embodiments, the touch panel 571 and the display panel 561 may be integrated to implement the input and output functions of the terminal. Details are not limited herein.

The interface unit 58 is an interface connecting an external apparatus to the terminal 50. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 58 may be configured to receive input (for example, data information and power) from the external apparatus and transmit the received input to one or more elements in the terminal 50, or may be configured to transmit data between the terminal 50 and the external apparatus.

The memory 59 may be configured to store a software program and various data. The memory 59 may mainly include a program storage area and a data storage area. The program storage area may store an operating system, and an application program required by at least one function (for example, a sound playing function and an image playing function). The data storage area may store data created according to use of the mobile phone (for example, audio data and a phonebook), and the like. In addition, the memory 59 may include a high-speed random access memory, and may also include a non-volatile memory, such as at least one disk storage device, a flash memory device, or other volatile solid-state memory devices.

The processor 510 is a control center of the terminal, and connects all parts of the entire terminal by using various interfaces and lines. By running or executing a software program and/or a module stored in the memory 59 and invoking data stored in the memory 59, the processor 510 performs various functions of the terminal and data processing, to perform overall monitoring on the terminal. The processor 510 may include one or more processing units. Optionally, the processor 510 may integrate an application processor and a modem processor. The application processor mainly deals with an operating system, a user interface, an application, and the like. The modem processor mainly deals with wireless communication. It can be understood that, alternatively, the modem processor may not be integrated into the processor 510.

The terminal 50 may also include a power supply 511 (for example, a battery) that supplies power to various components. Optionally, the power supply 511 may be logically connected to the processor 510 through a power supply management system, to perform functions of managing charging, discharging, and power consumption through the power supply management system.

In addition, the terminal 50 includes some functional modules not shown. Details are not described herein again.

Optionally, some embodiments of the present disclosure further provide a terminal, including a processor 510, a memory 59, and a program that is stored in the memory 59 and that can run on the processor 510. When the program is executed by the processor 510, the processes of the embodiment of the foregoing random access transmission method are implemented, and the same technical effects can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal, and may be, for example, a portable, pocket-sized, handheld, computer built-in, or vehicle-mounted mobile apparatus, which exchange language and/or data with a radio access network. For example, the wireless terminal may be a personal communication service (PCS) telephone, a cordless telephone, a session initiation protocol (SIP) phone set, a wireless local loop (WLL) station, a personal digital assistant (PDA), and another device. The wireless terminal may also be referred to as a system, a subscriber unit, a subscriber station, a mobile station, a mobile console (Mobile), a remote station, a remote terminal, an access terminal, a user terminal, a user agent, or a user device or user equipment. This is not limited herein.

Some embodiments of the present disclosure further provide a computer-readable storage medium. A computer program is stored in the computer-readable storage medium. When being executed by a processor, the computer program implements each process of the embodiment of the foregoing random access transmission method, and a same technical effect can be achieved. To avoid repetition, details are not described herein. The computer-readable storage medium is, for example, a read-only memory (ROM), a random access memory (RAM), a magnetic disk, or an optical disc.

Those of ordinary skill in the art can realize that the exemplary units and algorithm steps described with reference to the embodiments disclosed in this specification can be implemented by electronic hardware or a combination of computer software and electronic hardware. Whether these functions are implemented by hardware or software depends on specific applications and design constraints of the technical solutions. A person skilled in the art may use different methods to implement the described functions for each specific application, but such implementation should not be considered as exceeding the scope of this disclosure.

Those skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

In addition, functional units in each embodiment of this disclosure may be integrated into one processing unit, or each unit may have separate physical existence, or two or more units may be integrated in one unit.

If the function is implemented in the form of software function units and sold or used as independent products, the function may be stored in a computer readable storage medium. Based on such an understanding, the technical solutions of the present disclosure essentially, or the part contributing to the prior art, or some of the technical solutions may be implemented in a form of a software product. The computer software product is stored in a storage medium, and includes a plurality of instructions for instructing a computer device (which may be a personal computer, a server, or a network device) to perform all or some of the steps of the methods described in the embodiments of the present disclosure. The storage medium includes various mediums, such as a USB flash disk, a removable hard disk, a ROM, a RAM, a magnetic disk, or an optical disc, which can store program code.

In addition, it should be noted that in the apparatuses and methods of this disclosure, it is obvious that the components or the steps may be divided and/or recombined. These divisions and/or recombinations should be considered as equivalent solutions of this disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any of the steps or the components of the methods and the apparatuses of this disclosure may be implemented in any computing apparatus (including a processor, a storage medium, and the like) or a computing apparatus network in the form of hardware, firmware, software, or a combination thereof. Those of ordinary skill in the art can implement this by using their basic programming skills after reading the description of this disclosure.

Therefore, the objective of this disclosure may also be achieved by running a program or a set of programs on any computing apparatus. The computing apparatus may be a well-known general-purpose apparatus. Therefore, the objective of this disclosure may also be achieved only by providing a program product including program code for implementing the method or the apparatus. In other words, such a program product also constitutes this disclosure, and a storage medium storing such a program product also constitutes this disclosure. Obviously, the storage medium may be any well-known storage medium or any storage medium to be developed in the future. It should be further noted that in the apparatuses and methods of this disclosure, it is obvious that the components or the steps may be divided and/or recombined. These divisions and/or recombinations should be considered as equivalent solutions of this disclosure. Moreover, the steps for performing the foregoing series of processing may be performed naturally in chronological order according to a described sequence, but do not necessarily need to be performed in chronological order, and some steps may be performed in parallel or independently.

The optional implementations of this disclosure are described above. It should be noted that persons of ordinary skill in the technical field may further make several improvements and refinements without departing from the principles described in this disclosure, and these improvements and refinements also fall within the protection scope of this disclosure.

The invention claimed is:

1. A random access transmission method, applied to a terminal side, comprising:

obtaining a demodulation reference signal (DMRS) sequence generation parameter of a physical uplink shared channel (PUSCH); and sending a random access message to a network device according to the DMRS sequence generation parameter; wherein the random access message corresponds to the PUSCH and a physical random access channel (PRACH);

wherein the DMRS sequence generation parameter is determined according to a PRACH resource, and the DMRS sequence generation parameter comprises: a scrambling initialization parameter;

wherein the sending the random access message to the network device according to the DMRS sequence generation parameter comprises:

mapping between the DMRS sequence generation parameter and a corresponding random access resource according to a mapping order, and sending the random access message; wherein the mapping order comprises at least one of: a code domain mapping order, a frequency domain mapping order, or a time domain mapping order.

2. The random access transmission method according to claim 1, wherein the DMRS sequence generation parameter further comprises: a scrambling identifier parameter;

the sending the random access message to the network device according to the DMRS sequence generation parameter comprises:

determining a DMRS sequence of the PUSCH according to the DMRS sequence generation parameter; and sending the random access message according to the DMRS sequence.

3. The random access transmission method according to claim 1, wherein the DMRS sequence generation parameter is determined according to at least one of the following information of the PRACH resource:

a random access channel occasion (RO);

a random access preamble; or a random access radio network temporary identifier (RA-RNTI).

4. The random access transmission method according to claim 3, wherein the DMRS sequence generation parameter is determined according to index information of the random access preamble.

5. The random access transmission method according to claim 1, wherein the DMRS sequence generation parameter is configured by the network device through a system broadcast message.

6. The random access transmission method according to claim 5, wherein the system broadcast message comprises: configuration information of a DMRS sequence generation set.

7. The random access transmission method according to claim 6, wherein the DMRS sequence generation parameter is a parameter associated with the following associated parameters in the DMRS sequence generation parameter set:

an RO corresponding to a random access process;

index information of the SSB associated with the RO; and index information of the random access preamble.

8. The random access transmission method according to claim 1, wherein the DMRS sequence generation parameter is further determined according to a PUSCH resource.

9. The random access transmission method according to claim 8, wherein the DMRS sequence generation parameter is determined according to a PUSCH occasion corresponding to the PUSCH resource.

10. A terminal, comprising a processor, a memory, and a program stored in the memory and running on the processor, wherein when the program is executed by the processor, the following steps are performed:

obtaining a demodulation reference signal (DMRS) sequence generation parameter of a physical uplink shared channel (PUSCH); and sending a random access message to a network device according to the DMRS sequence generation parameter; wherein the random access message corresponds to the PUSCH and a physical random access channel (PRACH);

wherein the DMRS sequence generation parameter is determined according to a PRACH resource, and the DMRS sequence generation parameter comprises a scrambling initialization parameter;

wherein sending the random access message to the network device according to the DMRS sequence generation parameter comprises:

mapping between the DMRS sequence generation parameter and a corresponding random access resource according to a mapping order, and sending the random access message; wherein the mapping order comprises at least one of: a code domain mapping order, a frequency domain mapping order, or a time domain mapping order.

11. The terminal according to claim 10, wherein the DMRS sequence generation parameter further comprises: a scrambling identifier parameter;

the sending the random access message to the network device according to the DMRS sequence generation parameter comprises:

determining a DMRS sequence of the PUSCH according to the DMRS sequence generation parameter; and sending the random access message according to the DMRS sequence.

12. The terminal according to claim 10, wherein the DMRS sequence generation parameter is further determined according to a PUSCH resource.

13. The terminal according to claim 12, wherein the DMRS sequence generation parameter is determined according to a PUSCH occasion corresponding to the PUSCH resource.

14. The terminal according to claim 10, wherein the DMRS sequence generation parameter is determined according to at least one of the following information of the PRACH resource:

a random access channel occasion (RO);

a random access preamble; or a random access radio network temporary identifier (RA-RNTI).

15. The terminal according to claim 14, wherein the DMRS sequence generation parameter is determined according to index information of the random access preamble.

16. The terminal according to claim 10, wherein the DMRS sequence generation parameter is configured by the network device through a system broadcast message.

17. The terminal according to claim 16, wherein the system broadcast message comprises: configuration information of a DMRS sequence generation set.

18. The terminal according to claim 17, wherein the DMRS sequence generation parameter is a parameter associated with the following associated parameters in the DMRS sequence generation parameter set:

an RO corresponding to a random access process;

index information of the SSB associated with the RO; and index information of the random access preamble.

* * * * *